May 12, 1931.   B. L. DORSEY ET AL   1,804,387
AUTOMOBILE HOOD LOCK
Filed Aug. 11, 1928
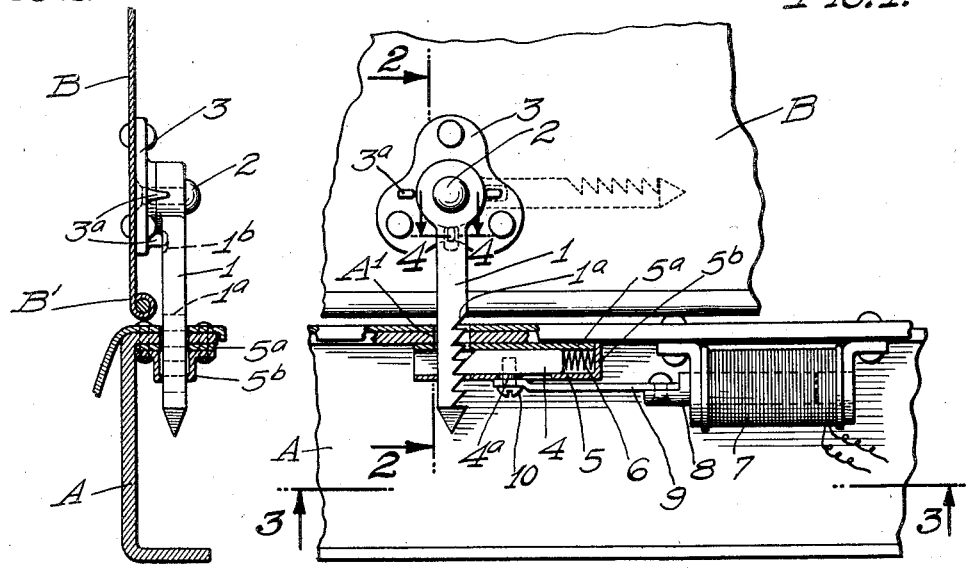
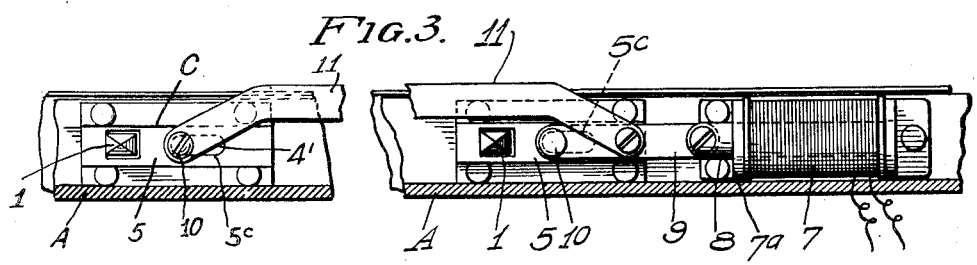
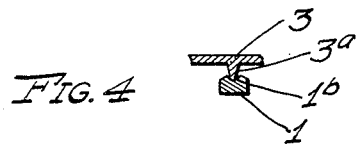
INVENTOR.
BENJAMIN L. DORSEY
THOMAS S. INGERSOLL
BY A. B. Bowman
ATTORNEY Patented May 12, 1931

1,804,387

UNITED STATES PATENT OFFICE

BENJAMIN L. DORSEY AND THOMAS S. INGERSOLL, OF LOS ANGELES, CALIFORNIA, ASSIGNORS, BY DIRECT AND MESNE ASSIGNMENTS, TO INGERSOLL MAGNETIC LOCK COMPANY, OF LOS ANGELES, CALIFORNIA, A CORPORATION OF CALIFORNIA

AUTOMOBILE HOOD LOCK

Application filed August 11, 1928. Serial No. 298,936.

Our invention relates to a locking mechanism, particularly adapted for locking a closure member relative to a frame, such as an automobile hood relative to the frame of the automobile.

The objects of our invention are: first, to provide a locking mechanism whereby the hood of an automobile may be locked in various positions relative to the frame thereof so that the hood may be locked tightly into position whether the hood is slightly distorted or not, or prevented for any reason from being shifted or drawn to its usual closed position; second, to provide means of this class whereby the hood may be held in various positions relative to the frame without the usual employment of springs for such purpose, the resiliency of the hood itself being made use of to hold the hood resiliently in a closed position; third, to provide a locking means of this class in which one of the locking members may be easily shifted out of the way so that the hood is not locked or automatically locked into position when not desired; fourth, to provide a mechanism of this class which is electrically controlled and in which the various parts are so connected that the same may be readily disconnected without interference with any of the other parts for replacement and repair; fifth, to provide a mechanism of this class whereby a plurality of locking means may be provided for locking one side of the hood to the frame of the automobile and in which all of the locking means are controlled by a unitary control means; sixth, to provide as a whole a novelly constructed mechanism of this class; and, seventh, to provide a mechanism of this class which is simple and economical of construction, durable, efficient and which will not readily deteriorate or get out of order.

With these and other objects in view, as will appear hereinafter, our invention consists of certain novel features of construction, combination and arrangement of parts and portions, as will be hereinafter described in detail and particularly set forth in the appended claims, reference being had to the accompanying drawings and to the characters of reference which form a part of this application, in which:

Figure 1 is a fragmentary inside elevational view of an automobile frame and engine hood, showing our locking means in connection therewith for holding and locking the hood in a closed position relative to the frame, and certain parts and portions broken away and in section to facilitate the illustration, and showing by dotted lines the locking member mounted on the hood shifted out of the way; Fig. 2 is a sectional elevational view thereof, taken through 2—2 of Fig. 1; Fig. 3 is a sectional view thereof, taken through 3—3 of Fig. 1, but showing the same in a slightly modified form of construction; and, Fig. 4 is a fragmentary sectional view thereof, taken through 4—4 of Fig. 1, showing the means for retaining the locking member in certain shifted positions.

Like characters of reference refer to similar parts and portions throughout the several views of the drawings.

In conventional automobile construction, the frame of the automobile is provided with main side frame members, shown fragmentarily and designated A in the drawings. Above the forward portion of the frame is positioned the shiftable or removable hood, designated B, for enclosing the engine and other mechanism of the automobile. The lower free edges or portions of the hood, designated $B^1$, are usually held in a closed position by a variety of latches operable from the outside of the hood, said latches being resilient or resiliently extendible so that the hood may be held in position whether the hood is slightly distorted or prevented for any other reason from being forced downwardly to its closed position. In other arrangements, the hood is locked in its closed position usually by fixed lock means.

In our invention, we provide a positive lock and yet such a lock which will lock the hood in a closed position whether the hood is shifted downwardly at its sides to its extreme lower position or not. Such locking is primarily effected by a locking member or locking plunger 1 of relatively small size which is mounted at its upper end on the hood and the lower end of which is provided with a plurality of notches 1a which receive a shiftable latch. The upper end of the locking plunger 1 is enlarged and is pivotally mounted by means of a rivet 2 on a bracket 3 which is secured to the inside of the hood B. The notched portion of the plunger extends preferably through the upper portion or flange of the frame through an opening A¹.

The latch member above referred to, and designated 4, consists of a plunger which is reciprocally mounted in a horizontal direction in a casing 5 which, as here shown, consists of a base member 5a and a casing member 5b, as shown in Fig. 2. This casing is secured to the frame A and preferably to the underside of the upper flange of the frame which extends inwardly.

This latch member 4 is urged into engagement with the notched portions of the locking plunger 1 by means of a compression spring 6 positioned between the end of the member 4 and the end of the casing 5. When the plunger 1 is in a locking position, as shown by solid lines in Fig. 1, the position of the latch member toward the plunger 1 is limited by the latter, but when the plunger is withdrawn, the shifting of the latch member 4 toward and into the opening traversable by the locking plunger is limited by a lug 4a at one side of the latch member, which lug extends through a longitudinal slot 5c on the casing 5 and is limited by the engagement of this lug with the portion of the casing 5 forming the one end of the slot nearest the portion of the casing traversable by the locking plunger.

The latch member 4 is withdrawn from the notches 1a and against the compression spring 6 by an electromagnet 7, also secured in this instance to the under side of the upper flange of the frame. This electromagnet is provided with a reciprocating plunger 8 which is adapted to be drawn into the coil of the electromagnet when the coil is energized. The normally outer end of the plunger or core 8 is pivotally connected by a link 9 to the portion of the lug 4a extending beyond the casing, such connection being preferably made by a screw 10 so that the link may be readily disconnected therefrom.

The electromagnet is connected to a suitable source of electrical energy, such as the storage battery of the automobile and the current therethrough is controlled by a suitable key lock or permutation lock mounted within convenient reach of the operator of the automobile, such lock not being shown.

The end of the locking plunger 1 is tapered at all sides so that the plunger may be easily inserted into the opening A¹, and also so that the latch member 4 may be easily forced inwardly in an out of the way position against the compression of the spring 6. The normally upper sides of the portions of the member 1 which form the upper sides of the notches 1a are also inclined so as to permit the member 4 to be shifted out of the way as the plunger 1 is forced downwardly. It will be here noted that as soon as the latch member 4 enters one notch of the plunger 1, the hood is locked in position, but as greater pressure is applied on the hood in a downward direction, the latch member 4 enters consecutively the next upper notch until the hood is locked in as tight a position as possible or desired, the resiliency of the hood itself serving to hold the several members in a slightly yieldable position relative to each other.

It will be here noted that if the electromagnet 7 is deenergized, the latch member 4 is forced into such position that is the plunger 1 enters the opening A¹ and the latch member 4 one of the notches 1a, the hood is immediately locked into position. In order to avoid such action when work is being done upon the engine or other mechanisms under the hood, the plunger 1 is shifted out of the way, such as the positions shown by dotted lines in Fig. 1. In order to hold the plunger in either its downward position or in any other position, as shown by dotted lines, we have provided a plurality of lugs 3a at the side of the bracket 3 adjacent the plunger 1, which lugs are adapted to enter a recess on the inner side of the locking plunger 1 near its hub mounting, as shown in Figs. 1 and 4. When slight force is applied to the member 1 for rotating the same, the lug 3a which had previously been positioned in the recess 1b for holding the member 1 in a certain position is dislodged, and if such rotation is continued until the recess 1b is opposite another lug 3a, the member 1 is held in a corresponding position.

It will be here noted that if it is desired to have more than one locking mechanism consisting of the locking plunger 1 and the latch 4, for holding one side of the hood, several of these locking mechanisms are secured to the frame and hood in alignment with each other and in the same relative position, as shown. The latches in such arrangement may be controlled by the same means or the same electromagnet. In order to effect, by a single solenoid, the shifting of another latch member more remotely positioned as shown by the lock C in Fig. 5, the latter latch member, designated 4', is connected, by means of a link 11 to the link 9, as shown in Fig. 3. In this instance, the link 11 is preferably offset so that the same will not interfere with the action of the locking plunger 1.

Though we have shown and described a particular construction, combination and arrangement of parts and portions, and a particular application of our locking means to an automobile frame and hood, and a certain modification thereof, we do not wish to be limited to the particular construction, combination and arrangement, nor to the particular application, nor to the modification, but desire to include in the scope of our invention the construction, combination and arrangement substantially as set forth in the appended claims.

Having thus described our invention, what we claim as new and desire to secure by Letters Patent is:

1. In a means of the class described, the combination with the main frame of an automobile, having a vertical hole therein, and an engine hood of the automobile, of a locking member mounted on said hood immediately at the inner side thereof and substantially parallel thereto and extending through the hole in said frame and provided with a plurality of longitudinally spaced notches, and a latch member shiftably mounted against the under side of said frame at one side of the opening, adapted to engage said locking member in one of said notches.

2. In a means of the class described, the combination with the main frame of an automobile, having an opening therein, and a closure member adapted to be closed toward said frame, of a locking plunger of the substantially the size of the opening mounted on the inside of said closure member immediately adjacent the inner side thereof and substantially parallel thereto and extendible through the opening in said frame and provided at one side with a plurality of notches spaced longitudinally from each other, and a latch member shiftably mounted on the under side of said frame adapted normally to engage said locking plunger in one of the notches thereof.

3. In a means of the class described, the combination with the main frame of an automobile, having an opening therein, and a closure member adapted to be closed toward said frame, of a locking plunger of substantially the size of the opening mounted on the inside of said closure member immediately adjacent the inner side thereof and substantially parallel thereto and extendible through the opening in said frame and provided at one side with a plurality of notches spaced longitudinally from each other, a latch member shiftably mounted at the under side of said frame adapted normally to engage said locking plunger in one of the notches thereof, and spring means in connection with said latch member for urging the same into engagement with said locking plunger, the portions of said locking plunger forming the outer sides of said notches being inclined at an angle and the extended end of said plunger being also inclined at an angle whereby the insertion of said plunger into said frame is facilitated and whereby said latch member is forced against the action of said spring when said locking plunger is forced into said frame so that the plunger and closure member are locked in the desired position relative to the frame depending upon the force applied on the closure member toward the frame.

4. In a means of the class described, the combination with a frame and a closure member adapted to be closed toward said frame, of a locking member pivotally mounted at one end on the inside of the closure member and extendible toward said frame or to the side and clear of the frame, and latch means on said frame adapted to engage said locking member when the latter is directed toward said frame and into engagement with said latch means.

5. In a means of the class described, the combination with a frame and a closure member adapted to be closed toward said frame, of a locking member pivotally mounted at one end on the inside of the closure member and extendible toward said frame or to the side and clear of the frame, and latch means on said frame adapted to engage said locking member when the latter is directed toward said frame and into engagement with said latch means, said locking member having a plurality of spaced notches at one side for receiving said latch means and locking the closure member relative to the frame in various positions.

6. In a means of the class described, the combination with a frame and a closure member adapted to be locked relative to the frame, of a plurality of locking members mounted on said closure member, a plurality of latch members shiftably mounted on said frame adapted to engage said locking members, a single solenoid mounted on said frame, and link means connecting each of said latch members to said solenoid.

7. In a means of the class described, the combination with a frame and a closure member adapted to be locked relative to said frame, a locking member mounted on said closure member, latch means mounted on said frame adapted to receive and retain said locking member, a solenoid mounted on said frame, a link connecting said solenoid to said latch means, and a second link connected to the first link and extended around said locking member for actuating another latch.

In testimony whereof, we have hereunto set our hands at Los Angeles, California, this 3rd day of August, 1928.

BENJAMIN L. DORSEY.
THOMAS S. INGERSOLL.